United States Patent
Nguyen et al.

(10) Patent No.: US 11,503,616 B2
(45) Date of Patent: Nov. 15, 2022

(54) MISSED RESERVATION LIMIT IN WIRELESS NETWORKS

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Hillsborough, NJ (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 16/790,530

(22) Filed: Feb. 13, 2020

(65) Prior Publication Data

US 2020/0267739 A1 Aug. 20, 2020

Related U.S. Application Data

(60) Provisional application No. 62/806,587, filed on Feb. 15, 2019.

(51) Int. Cl.
*H04W 72/12* (2009.01)
*H04W 72/04* (2009.01)

(52) U.S. Cl.
CPC ....... *H04W 72/12* (2013.01); *H04W 72/0446* (2013.01); *H04W 72/1226* (2013.01); *H04W 72/1252* (2013.01)

(58) Field of Classification Search
CPC ............. H04W 72/12; H04W 72/0446; H04W 72/1226; H04W 72/1252; H04W 28/26; H04W 4/46
See application file for complete search history.

(56) References Cited

U.S. PATENT DOCUMENTS

| | | | |
|---|---|---|---|
| 2005/0117541 A1* | 6/2005 | Negus | H04W 28/26 370/329 |
| 2008/0198780 A1* | 8/2008 | Sato | H04L 47/765 370/310 |

(Continued)

FOREIGN PATENT DOCUMENTS

WO WO-2018067400 A1 4/2018

OTHER PUBLICATIONS

Wormsbecker and C. Williamson, "On Channel Selection Strategies for Multi-Channel MAC Protocols in Wireless Ad Hoc Networks," in 2006 2nd IEEE International Conference on Wireless and Mobile Computing Networking and Communications, Montreal, Que., 2006 pp. 212-220. (Year: 2006).*

(Continued)

*Primary Examiner* — Ivan O Latorre

(74) *Attorney, Agent, or Firm* — Loza & Loza, LLP/Qualcomm Incorporated

(57) ABSTRACT

Aspects relate to limiting the number of missed reservations by a wireless communication device, such as a vehicle-to-everything (V2X) device. The wireless communication device may calculate a missed reservation metric associated with one or more missed reservations missed by the wireless communication device. The wireless communication device may then limit additional reservations when the missed reservation metric exceeds a missed reservation limit.

32 Claims, 8 Drawing Sheets

(56) References Cited

U.S. PATENT DOCUMENTS

| | | | | |
|---|---|---|---|---|
| 2008/0218413 | A1* | 9/2008 | Li | H04B 7/04 |
| | | | | 342/367 |
| 2008/0306797 | A1* | 12/2008 | Fayaz | G06Q 10/02 |
| | | | | 705/7.22 |
| 2019/0182890 | A1* | 6/2019 | Jeong | H04W 72/14 |
| 2020/0229041 | A1* | 7/2020 | Nguyen | H04L 47/2433 |
| 2020/0267742 | A1* | 8/2020 | Nguyen | H04W 76/16 |
| 2020/0280961 | A1* | 9/2020 | Lee | H04W 4/40 |
| 2021/0266951 | A1* | 8/2021 | Gulati | H04B 17/318 |
| 2021/0297906 | A1* | 9/2021 | Wang | H04W 8/24 |

OTHER PUBLICATIONS

Ericsson: "Correction to Resource Reselection for V2X", 3GPP Draft, 3GPP TSG-RAN WG2 #97, 36331_CR0999_(REL-14)_R2-1700939—Correction to Resource Reselection Procedure in RRC, 3rd Generation Partnership Project (3GPP), Mobile Competence Centre, 650, Route Des Lucioles, F-06, vol. RAN WG2, No. Athens, Greece, Feb. 13, 2017-Feb. 17, 2017, Feb. 3, 2017 (Feb. 3, 2017), XP051222668, 3 Pages, Retrieved from the Internet: URL: http://www.3gpp.org/ftp/tsg_ran/WG2_RL2/TSGR2_97/Docs/, [retrieved on Feb. 3, 2017], Abstract.

Huawei, et al., "Introduce a New Parameter for V2X Resource Reselection", 3GPP Draft, 3GPP TSG-RAN WG2 Meeting #97, 36331_CR2616_(REL-14)_R2-1701383_ Introduce a New Parameter for V2X Resource Reselection, 3rd Generation Partnership Project (3GPP), Mobile Competence Centre, 650, Route Des Lucioles, F-0, vol. RAN WG2, No. Athens, Feb. 13, 2017-Feb. 17, 2017, Feb. 4, 2017 (Feb. 4, 2017), XP051223162, 3 Pages, Retrieved from the Internet: URL: http://www.3gpp.org/ftp/tsg_ran/WG2_RL2/TSGR2_97/Docs/, [retrieved on Feb. 4, 2017], Abstract.

Huawei (Rapporteur): "Summary of [95bis#14][LTE/V2V] on Resource Reservation Problem", 3GPP Draft, 3GPP TSG-RAN WG2 Meeting #96, R2-167730 Summary of Email Discussion on Resource Reservation Problem, 3rd Generation Partnership Project (3GPP), Mobile Competence Centre, 650, Route Des Lucioles, F-06921, Sophia-Antipo, vol. RAN WG2, No. Reno, USA, Nov. 14, 2016-Nov. 18, 2016, Nov. 13, 2016 (Nov. 13, 2016), XP051177534, 8 Pages, Retrieved from the Internet: URL: http://www.3gpp.org/ftp/Meetings_3GPP_SYNC/RAN2/Docs/, [retrieved on Nov. 13, 2016], paragraph [8082].

Intel Corporation: "Sidelink Measurements for V2V Sensing and Resource Re-selection Procedures", 3GPP Draft, 3GPP TSG RAN WG1 Meeting #86, R1-166511, Intel—V2V Measurement, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 13, 2016 (Aug. 13, 2016), XP051132802, 5 Pages, Retrieved from the Internet: URL: http://www.3gpp.org/ftp/tsg_ran/WG1_RL1/TSGR1_86/Docs/, [retrieved on Aug. 13, 2016], paragraph [0001]-paragraph [0002].

International Search Report and Written Opinion—PCT/US2020/018248—ISAEPO—dated May 13, 2020.

NTT Docomo, et al., "Transmitter UE Behaviour for Sensing-Based Resource Allocation", 3GPP Draft, 3GPP TSG RAN WG1 Meeting #85, R1-165192 Reservation and Sensing Sidelink, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096221, 7 Pages, Retrieved from the Internet: URL: http://www.3gpp.org/ftp/tsg_ran/WG1_RL1/TSGR1_85/Docs/, [retrieved on May 14, 2016], paragraph [0002]-paragraph [0004].

* cited by examiner

MISSED RESERVATION LIMIT IN WIRELESS NETWORKS

PRIORITY CLAIM

This application claims priority to and the benefit of Provisional Patent Application No. 62/806,587, entitled "Missed Reservation Limit in V2X Networks," filed in the U.S. Patent and Trademark Office on Feb. 15, 2019, the entire contents of which are incorporated herein by reference as if fully set forth below in their entirety and for all applicable purposes.

TECHNICAL FIELD

The technology discussed below relates generally to wireless communication networks, and more particularly, to missed reservations in a wireless communication network, such as a Vehicle-to-Everything (V2X) wireless network.

INTRODUCTION

Vehicle-to-Everything (V2X) communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

Within a V2X network, control information may be communicated between V2X devices through a physical sidelink control channel (PSCCH), while data may be communicated between V2X devices through a physical sidelink shared channel (PSSCH). The control information may include a reservation of resources for a V2X device to transmit data to one or more other V2X devices. If the V2X device misses the reservation (e.g., the V2X device is unable to use the reserved resources for a transmission), another V2X device may not transmit on overlapping resources. As the demand for V2X communication increases, research and development continue to advance V2X technologies not only to meet the growing demand for V2X, but also to advance and enhance the vehicle driving experience.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a wireless communication device is disclosed. The method includes reserving resources on a carrier for each of a plurality of reservations, each associated with a respective transmission to one or more other wireless communication devices. The method further includes missing at least one missed reservation of the plurality of reservations, and limiting additional reservations when a missed reservation metric associated with the at least one missed reservation exceeds a missed reservation limit.

Another example provides a wireless communication device including a processor, a wireless transceiver communicatively coupled to the processor and configured to communicate over a carrier, and a memory communicatively coupled to the processor. The processor and the memory are configured to reserve resources on a carrier for each of a plurality of reservations, each associated with a respective transmission to one or more other wireless communication devices. The processor and the memory are further configured to miss at least one missed reservation of the plurality of reservations, and limit additional reservations when a missed reservation metric associated with the at least one missed reservation exceeds a missed reservation limit.

Another example provides a wireless communication device for wireless communication over a carrier. The wireless communication device includes means for reserving resources on the carrier for each of a plurality of reservations, each associated with a respective transmission to one or more other wireless communication devices. The wireless communication device further includes means for missing at least one missed reservation of the plurality of reservations, and means for limiting additional reservations when a missed reservation metric associated with the at least one missed reservation exceeds a missed reservation limit.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
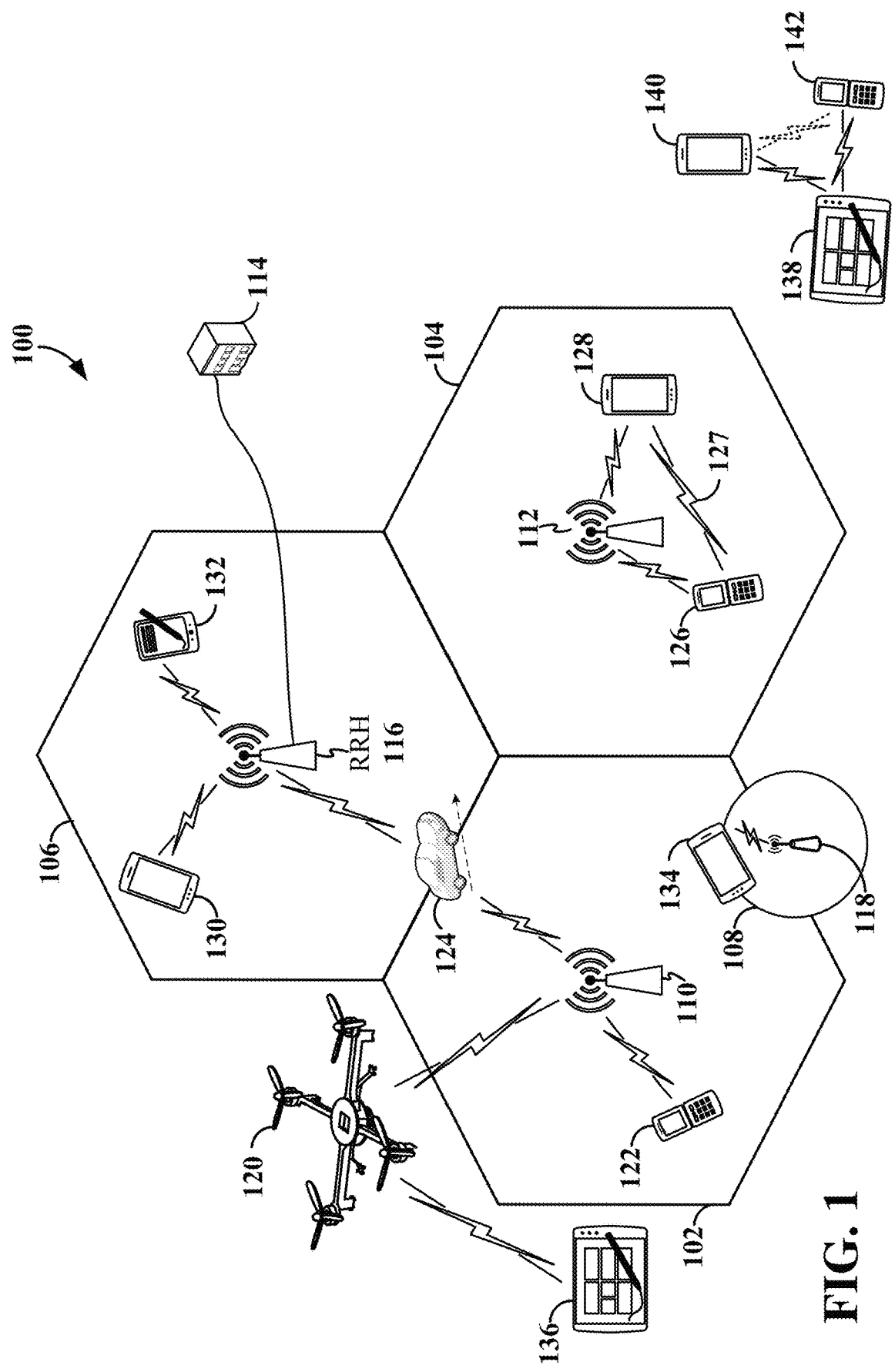
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to mechanisms for limiting the number of missed reservations by a wireless communication device (e.g., a V2X device) in a wireless communication network. Here, a reservation refers to a PSSCH containing control information reserving one or more resource blocks over one or more slots for a transmission by the V2X device. The V2X device may miss a reservation when the V2X device does not transmit data on any of the reserved resources. The V2X device may calculate a missed reservation metric associated with one or more missed reservations missed by the wireless communication device. The V2X device may then limit additional reservations (e.g., the number of additional reservations and/or the number of resource blocks reserved for additional reservations) when the missed reservation metric exceeds a missed reservation limit.

For each reservation missed by the V2X device, the V2X device may generate missed reservation information indicating that a reservation has been missed for internal use by the V2X device. In some examples, the missed reservation information may include a number of resource blocks reserved for the missed transmission. For example, the missed reservation information may indicate the number of resource blocks reserved within a single slot and the number of slots across which the resources were reserved for the missed reservation.

The V2X device may calculate the missed reservation metric based on the missed reservation information associated with one or more missed reservations. In some examples, the missed reservation metric indicates a number of missed reservations within a predefined window of time. In other examples, the missed reservation metric indicates a total number of resource blocks reserved for the missed reservations within the predefined window of time. In still other examples, the missed reservation metric may include a ratio of the number of missed reservations to the number of reservations made within the predefined window of time, or a ratio of the total number of resource blocks reserved for the missed reservations to the complete number of resource blocks reserved for the reservations made within the predefined window of time.

The V2X device may compare the missed reservation metric to the missed reservation limit and limit the number of additional reservations made by the V2X device when the missed reservation metric exceeds a missed reservation limit. In some examples, the V2X device may prohibit additional reservations from being made within a period of time and/or until the missed reservation metric no longer exceeds the missed reservation limit, thereby preventing additional reservations from being missed. In some examples, a separate missed reservation metric may be calculated for each of a plurality of priorities, quality of service (QoS) indicators or traffic sizes associated with the transmissions. Each missed reservation metric (e.g., for each of the priority, QoS indicators or traffic sizes) may then be compared to a respective missed reservation limit and additional reservations related to each of the priorities, QoS indicators, or traffic sizes may be separately limited based on the results of the comparisons.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In some examples, two or more UEs (e.g., UEs 126 and 128) within the coverage area of a serving base station 112 may communicate with each other using sidelink signals 127 without relaying that communication through the base station. In this example, one or both of the UEs 126 and 128 may function as scheduling entities to schedule sidelink communication therebetween. For example, UEs 126 and 128 may communicate sidelink signals 127 within a V2X network.

Two primary technologies that may be used by V2X networks include dedicated short range communication (DSRC) based on IEEE 802.11p standards and cellular V2X based on LTE and/or 5G (New Radio) standards. C-V2X is designed to be compatible with both 4G LTE and emerging New Radio (NR) technologies, enabling C-V2X devices to support both C-V2X connections and LTE and/or NR connections. Various aspects of the present disclosure may relate to New Radio (NR) cellular V2X networks, referred to herein as V2X networks, for simplicity. However, it should be understood that the concepts disclosed herein may not be limited to a particular V2X standard.

Figure 2:
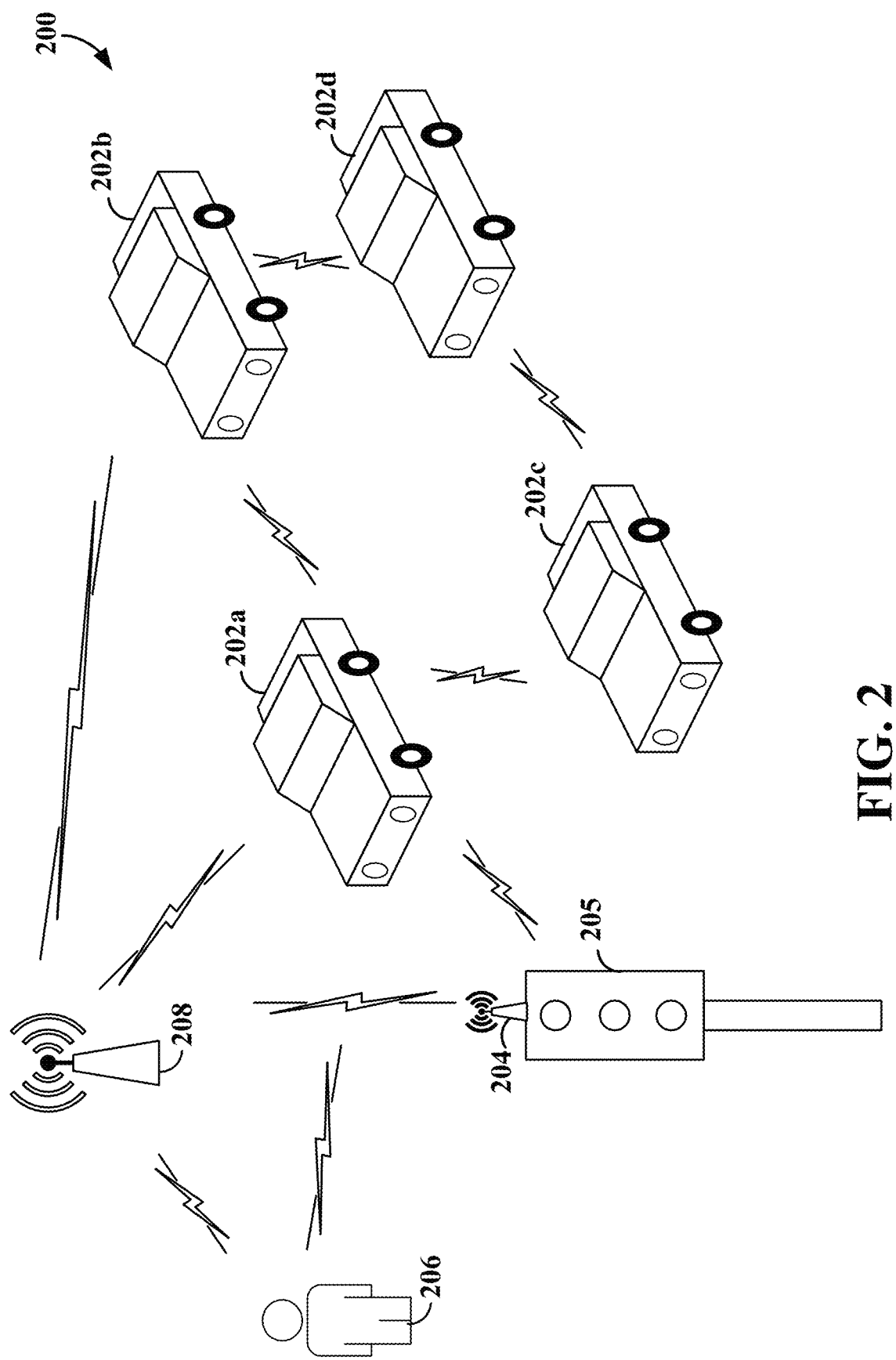
FIG. 2 is a diagram illustrating an example of a vehicle-to-everything (V2X) wireless communication network according to some aspects.

FIG. 2 illustrates an example of a vehicle-to-everything (V2X) wireless communication network 200. A V2X network can connect vehicles 202a-202d to each other (vehicle-to-vehicle (V2V)), to roadway infrastructure 204/205 (vehicle-to-infrastructure (V2I)), to pedestrians/cyclists 206 (vehicle-to-pedestrian (V2P) (e.g., mobile devices, such as user equipment (UE) and/or wearables of pedestrians/cyclists)), and/or to the network 208 (vehicle-to-network (V2N)).

A V2I transmission may be between a vehicle (e.g., vehicle 202a) and a roadside unit (RSU) 204, which may be coupled to various infrastructure 205, such as a traffic light, building, streetlight, traffic camera, tollbooth, or other stationary object. The RSU 204 may act as a base station enabling communication between vehicles 202a-202d, between vehicles 202a-202d and the RSU 204 and between vehicles 202a-202d and mobile devices 206 of pedestrians/cyclists. The RSU 204 may further exchange V2X data gathered from the surrounding environment, such as a connected traffic camera or traffic light controller, V2X connected vehicles 202a-202d, and mobile devices 206 of pedestrians/cyclists, with other RSUs 204 and distribute that V2X data to V2X connected vehicles 202a-202d and pedestrians 206. Examples of V2X data may include status information (e.g., position, speed, acceleration, trajectory, etc.) or event information (e.g., traffic jam, icy road, fog, pedestrian crossing the road, collision, etc.), and may also include video data captured by a camera on a vehicle or coupled to an RSU 204.

Such V2X data may enable autonomous driving and improve road safety and traffic efficiency. For example, the exchanged V2X data may be utilized by a V2X connected vehicle 202a-202d to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device 206 of a pedestrian/cyclist may be utilized to trigger a warning sound, vibration, flashing light, etc., in case of imminent danger.

V2N communication may utilize traditional cellular links to provide cloud services to a V2X device (e.g., within a vehicle 202a-202d or RSU 204, or on a pedestrian 206) for latency-tolerant use cases. For example, V2N may enable a V2X network server to broadcast messages (e.g., weather, traffic, or other information) to V2X devices over a wide area network and may enable V2X devices to send unicast messages to the V2X network server. In addition, V2N communication may provide backhaul services for RSUs 204.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
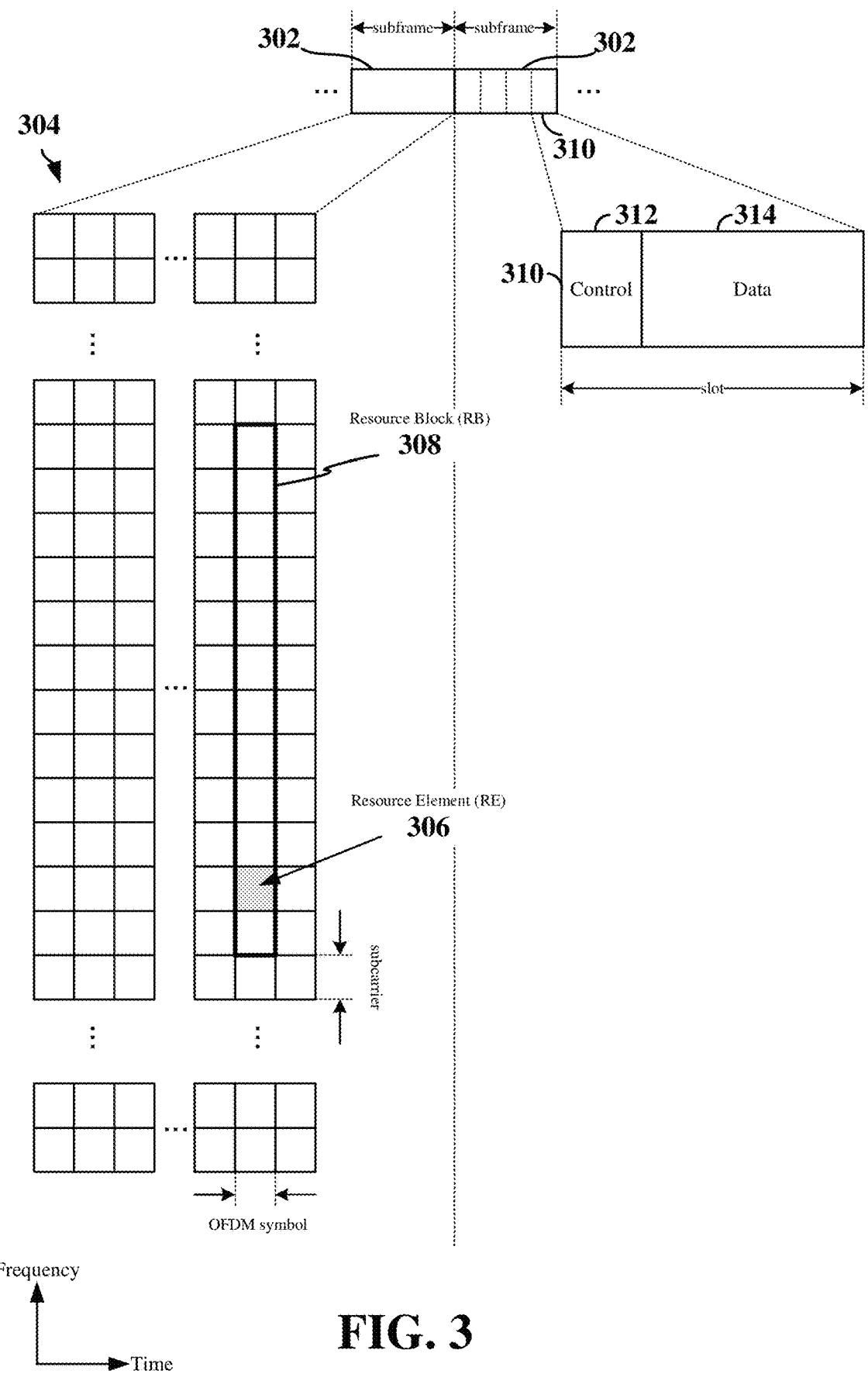
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or V2X devices for downlink, uplink, or sidelink transmissions typically involves scheduling one or more resource elements 306 within one or more subbands. Thus, a UE or V2X device generally utilizes only a subset of the resource grid 304. In some examples, an RB may be the smallest unit of resources that can be allocated to a UE/V2X device. Thus, the more RBs scheduled for a UE/V2X device, and the higher the modulation scheme chosen for the air interface, the higher the data rate for the UE/V2X device.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. In V2X networks, a broadcast communication may refer to a point-to-multipoint transmission by one V2X device (e.g., a vehicle, roadside unit (RSU), UE of a pedestrian/cyclist, or other V2X device) to other V2X devices. A unicast communication may refer to a point-to-point transmission by one V2X device (e.g., a vehicle, roadside unit (RSU), UE of a pedestrian/cyclist, or other V2X device) to a single other V2X device.

In an example of a V2X system, the control region 312 of the slot 310 may include sidelink control information transmitted by a transmitting V2X device towards a set of one or more receiving V2X devices nearby the transmitting V2X device. In some examples, the sidelink control information may include synchronization information to synchronize communication by a plurality of V2X devices on the V2X channel. In addition, the sidelink control information may include scheduling information indicating one or more resource blocks within the data region 314 of the slot 310 reserved by the transmitting V2X device to transmit data to the set of one or more receiving V2X devices. For example, the control region 312 of the slot 310 may include the scheduling information, while the data region 314 of the slot 310 may include V2X data transmitted in accordance with the scheduling information. The scheduling information may further relate to an expected subsequent transmission in a later slot and/or to a transmission spanning multiple slots. For example, the V2X device may reserve resource blocks across multiple slots for a large transmission. By reserving resources for a subsequent transmission, another nearby V2X device may refrain from using the same (or overlapping) resources to avoid interfering with the expected transmission.

In some examples, the scheduling information may further include information related to the data, such as a modulation and coding scheme utilized for the data. The data may include V2X data, such as status information (e.g., position, speed, acceleration, trajectory, etc.) and/or event information (e.g., traffic jam, icy road, fog, pedestrian crossing the road, collision, etc.), and may also include video data captured by a camera on a vehicle or coupled to an RSU. In some examples, the control information may be transmitted within a physical sidelink control channel (PSCCH), while the data may be transmitted within a physical sidelink shared channel (PSSCH).

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between V2X devices, and those of ordinary skill in the art will recognize that other channels or carriers may be utilized in addition to those illustrated, such as other traffic, control, and feedback channels.

In some examples, after scheduling a transmission (e.g., reserving resources on the V2X carrier for the transmission), the V2X device may determine that it has to miss the reservation (e.g., determine that the entire transmission cannot occur on the reserved resources). Here, a V2X device may miss a reservation when the V2X device does not utilize any of the scheduled resource blocks associated with the reservation for a transmission. For example, the V2X device may reserve resources for additional packets upon transmitting a previous packet. If the packet does not arrive in the transmit buffer of the V2X device prior to the reservation (e.g., prior to the scheduled resource blocks for the transmission), the V2X device may miss the reservation. As another example, if the packet is larger than the number of resource blocks scheduled for the transmission, the V2X device may miss the reservation and schedule a new reservation for the larger sized packet. In addition, in V2X networks in which NR V2X coexists with LTE V2X, the resources reserved for a NR V2X transmission may overlap in time with an LTE V2X transmission. In this situation, the NR V2X transmission may be missed due to limitations on concurrent LTE V2X and NR V2X transmissions. The V2X device may further miss the reservation when the congestion level on the V2X channel is high.

If the V2X device misses the transmission, another V2X device may not transmit on overlapping resources, thus resulting in underutilized resources. In addition, if the packet still needs to be transmitted, the V2X device may randomly select resources for the transmission without reserving the resources. However, the resources randomly selected by the V2X may also be randomly selected by another V2X device for another transmission, thus resulting in collisions and increasing the interference on the V2X channel. In general, the impact of the missed reservation may depend on the traffic load on the V2X channel and the priority of the missed transmission.

Therefore, in various aspects of the disclosure, to possible reduce the impact of missed reservations, a limit on the number of missed reservations allowed for a V2X device may be established. In some examples, the limit may correspond to a maximum number of missed reservations allowed within a window of time or a maximum number of resource blocks that may be reserved for missed reservations within a window of time. Once the limit is reached, the V2X device may limit additional reservations. In some examples, the V2X device may be prohibited from attempting to reserve resources for additional transmissions (e.g., for a period of time or until the number of missed reservations falls below the limit over a rolling window of time). In this way, the V2X device may be prevented from missing additional reservations.

Figure 4:
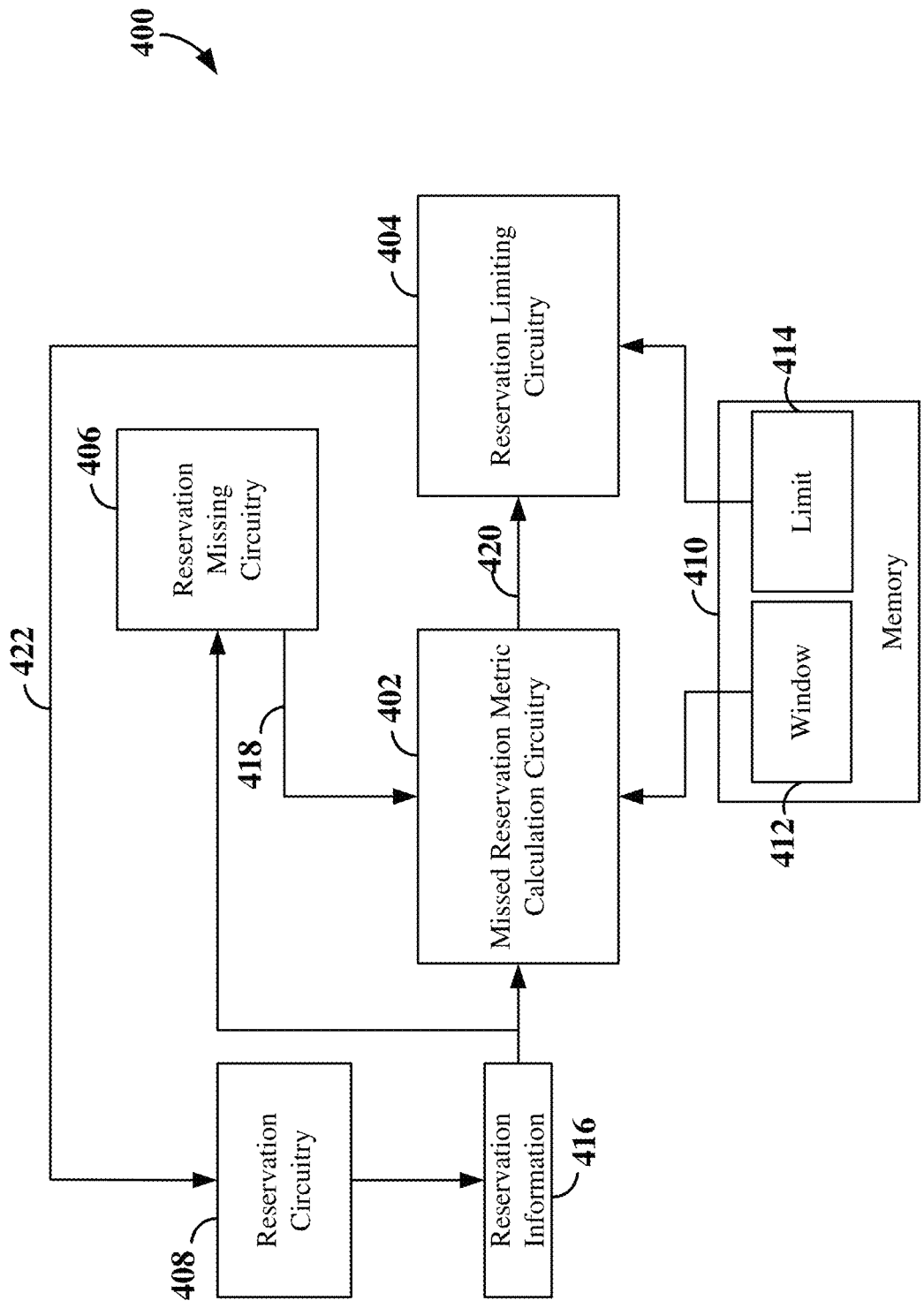
FIG. 4 is a block diagram illustrating an example of communication circuitry within a wireless communication device according to some aspects.

FIG. 4 is a block diagram illustrating an example of communication circuitry 400 within a wireless communication device (e.g., a V2X device or other sidelink device) configured to limit the number of missed reservations. The communication circuitry 400 includes missed reservation metric calculation circuitry 402, reservation limiting circuitry 404, reservation missing circuitry 406, reservation circuitry 408, and a memory 410. The memory 410 may include, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing data.

The missed reservation metric calculation circuitry 402 may be configured to receive reservation information 416 associated with a number of reservations made by the wireless communication device from the reservation circuitry 408. Again, a reservation refers to a PSSCH containing control information reserving one or more resource blocks over one or more slots for a transmission (e.g., transmission of V2X data) by the wireless communication device. In some examples, the reservation information 416 may include a number of resource blocks reserved for the transmission. For example, the reservation information 416 may indicate the number of resource blocks reserved within a single slot and the number of slots across which the resources were reserved for the reservation. In some examples, each reservation may be self-scheduled by the reservation circuitry 408. For example, the reservation circuitry 408 may be configured to sense a carrier (e.g., a V2X carrier) to determine whether one or more resource blocks of the carrier are idle or otherwise available for a transmission and then schedule the transmission on the available resource blocks over one or more slots. The reservation circuitry 408 may then produce the reservation information 416 indicative of the reserved resources (e.g., resource blocks) for the transmission.

The missed reservation metric calculation circuitry 402 may receive the reservation information 416 for each reservation made by the wireless communication device and accumulate the reservation information 416 over a predefined window 412 (e.g., a window of time) maintained by the memory 410. For example, the window 412 may be 1 second, 5 seconds, 10 seconds, or any suitable duration of time. The window 412 may be preconfigured on the wireless communication device or may be set by the network (e.g., the window 412 may be received via radio resource control (RRC) signaling or other suitable signaling). In some examples, the window 412 is a rolling window and the missed reservation metric calculation circuitry 402 may continuously update the reservation information 416 received within the current window 412 over time.

The missed reservation metric calculation circuitry 402 may further be configured to receive missed reservation information 418 from the reservation missing circuitry 406. The reservation missing circuitry 406 may be configured to receive the reservation information 416 and determine to miss one or more scheduled transmissions (e.g., determine that transmissions cannot occur on the reserved resources) due to any of a number of suitable factors. For example, the reservation missing circuitry 406 may determine to miss a reservation if a packet for a previously reserved transmission does not arrive in the transmit buffer prior to the reservation (e.g., prior to the scheduled resource blocks for the transmission). The reservation missing circuitry 406 may further determine to miss a reservation if the packet is larger than the number of resource blocks scheduled for the transmission. In addition, in V2X networks in which NR V2X coexists with LTE V2X, the reservation missing circuitry 406 may determine to miss the reservation if the resources reserved for a NR V2X transmission overlap in time with an LTE V2X transmission. The reservation missing circuitry 406 may further determine to miss the reservation when the channel congestion is above a threshold.

The reservation missing circuitry 406 may be configured to generate the missed reservation information 418 for each missed reservation. In some examples, the missed reservation information 418 may include a number of resource blocks reserved for the missed transmission. For example, the missed reservation information 418 may indicate the number of resource blocks reserved within a single slot and the number of slots across which the resources were reserved for the missed reservation. The missed reservation metric calculation circuitry 402 may receive the missed reservation information 418 for each reservation missed by the reservation missing circuitry 406 and accumulate the missed reservation information 418 over the predefined window 412.

The missed reservation metric calculation circuitry 402 may further calculate a missed reservation metric 420 based on at least the missed reservation information 418 received within the window 412. In some examples, the missed reservation metric 420 indicates the number of missed reservations within the window 412. In other examples, the missed reservation metric 420 indicates the total number of resource blocks reserved for the missed reservations within the window 412. In some examples, the missed reservation metric 420 may be calculated based on both the missed reservation information 418 and the reservation information 416. For example, the missed reservation metric 420 may include a ratio of the number of missed reservations to the number of reservations made within the window 412, or a ratio of the total number of resource blocks reserved for the missed reservations to the complete number of resource blocks reserved for the reservations made within the window 412. Thus, the missed reservation metric ($MR_{metric}$) may be expressed as either of the following:

$$MR_{metric} = \frac{\text{Number Dropped Reservations}}{\text{Number Reservations}}, \quad \text{(Equation 1)}$$

$$MR_{metric} = \frac{\text{Number Missed } RBs}{\text{Number Reserved } RBs}, \quad \text{(Equation 2)}$$

where the number of missed RBs and the number of reserved RBs may each be calculated based on the number of RBs reserved for one slot and the number of slots reserved. For example, for each reservation (or missed reservation), the number of RBs ($Number_{RBs}$) may be calculated as:

$$Number_{RBs} = \text{Number RBs Reserved in a Slot} * \text{Number of Slots}. \quad \text{(Equation 3)}$$

In some examples, the missed reservation metric calculation circuitry 402 may calculate a separate missed reservation metric for each of a plurality of transmission characteristics, such as the priority, quality of service (QoS) indicator or traffic size associated with each transmission. For example, each transmission (e.g., of a packet) may be associated with a particular priority, a particular QoS indicator, or a particular traffic size (e.g., length of the packet). In some examples, the QoS indicators may be 5Qi (5G QoS Indicators) parameters. The missed reservation metric calculation circuitry 402 may identify the priority, QoS indicator, or traffic size associated with each reservation and each missed reservation within the window and may calculate the respective missed reservation metric for each identified priority, QoS indicator, or traffic size. In some examples, each missed reservation metric 420 may represent two or more of (or a range of) the priorities, QoS indicators or traffic sizes. If there are no reservations for a particular priority, QoS indicator, or traffic size within the window 412, the missed reservation metric calculation circuitry 402 may calculate the missed reservation metric 420 for that particular priority, QoS indicator, or traffic size as zero or other suitable value.

The reservation limiting circuitry 404 may receive the missed reservation metric (or metrics) 420 from the missed reservation metric calculation circuitry 402 and compare the missed reservation metric 420 to a missed reservation limit 414 maintained in the memory 410. In some examples, the missed reservation limit 414 indicates a maximum number of allowed missed reservations within the window 412. In other examples, the missed reservation limit 414 represents a threshold against which a ratio may be compared. For example, the ratio may include a ratio of the total number of missed reservations to the complete number of reservations or a ratio of the total number of missed RBs to the complete number of RBs reserved. The missed reservation limit 414 may further include a table mapping transmission characteristics (e.g., priorities, QoS indicators or traffic sizes) to respective missed reservation limits. In some examples, the missed reservation limit 414 may be preconfigured on the wireless communication device. In other examples, the missed reservation limit 414 may be received via RRC signaling or other suitable signaling from the wireless communication network.

The reservation limiting circuitry 404 may further be configured to generate a reservation limitation signal 422 indicating whether the missed reservation metric 420 exceeds the missed reservation limit 414 and provide the reservation limitation signal 422 to the reservation circuitry 408. In examples in which a separate missed reservation metric 420 is generated for each priority, QoS indicator, or traffic size, the reservation limiting circuitry 404 may compare each missed reservation metric to a corresponding missed reservation limit and separately generate a respective reservation limitation signal 422 for each priority, QoS indicator, or traffic size.

The reservation circuitry 408 may be configured to limit additional (new) reservations over a period of time and/or until the occurrence of an event when the reservation limitation signal 422 indicates that the missed reservation metric 420 exceeds the missed reservation limit 414. For example, the reservation circuitry 408 may be configured to limit the number of reservations and/or the amount of reserved resources (e.g., reserved resource blocks over one or more slots for one or more transmissions) within the period of time. The period of time may correspond to one or more slots that may immediately follow the current slot within which the reservation limitation signal 422 is generated or another suitable duration of time. As another example, the reservation circuitry 408 may be configured to limit scheduling of resources for additional packets (e.g., the number of reservations and/or number of resource blocks) until the reservation limitation signal 422 indicates that the missed reservation metric 420 does not exceed the missed reservation limit 414. As an example, the reservation limitation signal 422 may have a binary value (e.g., "0" when the missed reservation metric does not exceed the limit or a "1" when the missed reservation metric exceeds the limit).

The reservation circuitry 408 may further be configured to limit additional reservations for certain priorities, QoS indicators, or traffic sizes, but not all priorities, QoS indicators, or traffic sizes. As an example, higher priority traffic may be allowed fewer missed reservations than lower priority traffic. As another example, applications producing smaller packets (smaller traffic sizes) may be allowed more missed reservations than applications producing larger packets.

In some examples, the reservation circuitry 408 may be configured to prohibit additional reservations from being made (e.g., for the period of time and/or until the occurrence of the event) when the reservation limitation signal 422 indicates that the missed reservation metric 420 exceeds the missed reservation limit 414. By prohibiting additional (new) reservations from being made, the communication circuitry 400 may prevent additional missed reservations over the period of time and/or until the occurrence of the event.

Figure 5:
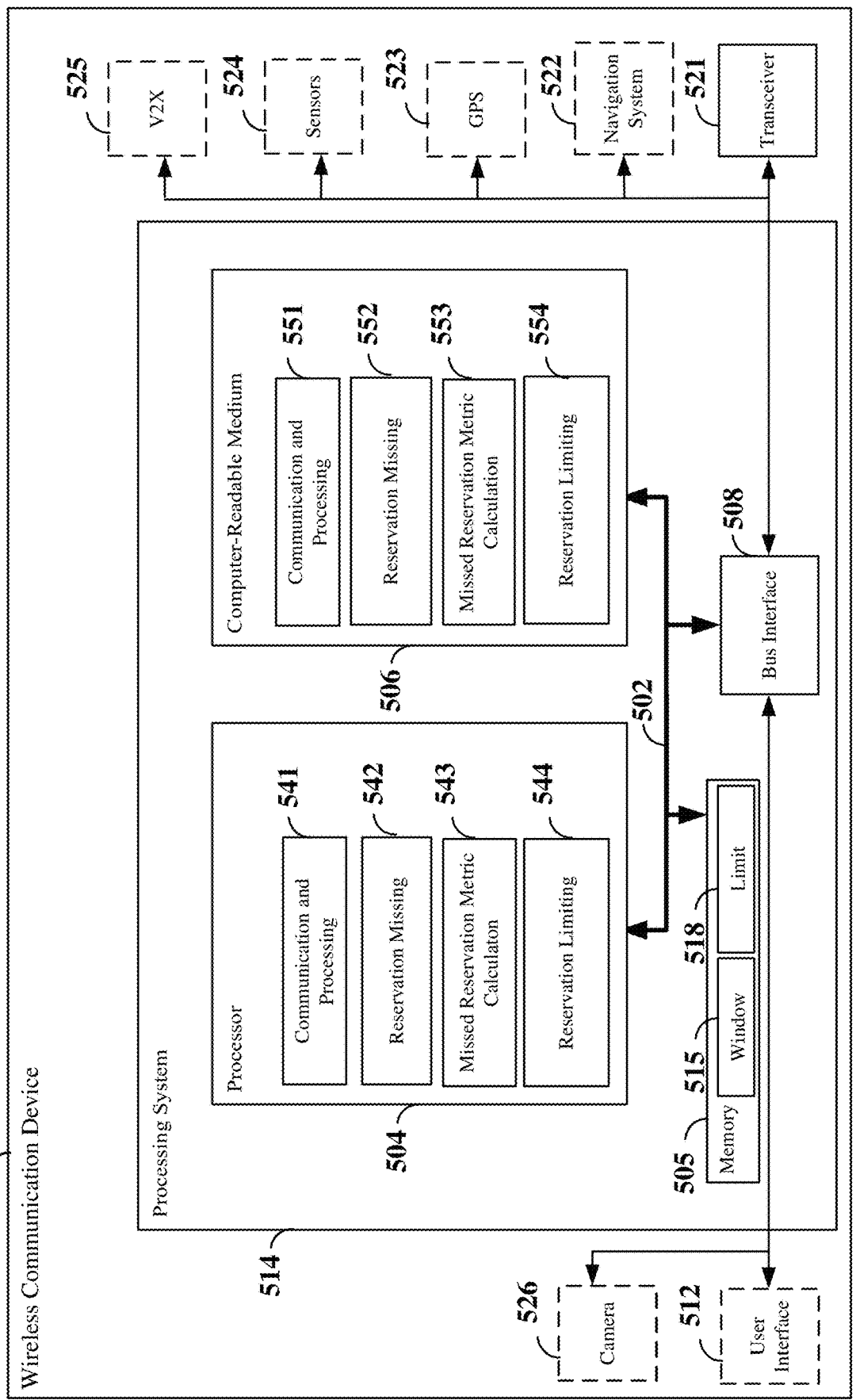
FIG. 5 is a block diagram illustrating an example of a hardware implementation for a wireless communication device employing a processing system according to some aspects.

FIG. 5 is a block diagram illustrating an example of a hardware implementation for a wireless communication device 500 employing a processing system 514. For example, the wireless communication device 500 may be a UE or other sidelink device, as shown in FIG. 1. In some examples, the wireless communication device 500 may be a V2X device, as shown in FIG. 2. For example, the V2X device may correspond to or be included within a vehicle, mobile or wearable device of a pedestrian/cyclist, or RSU, as shown and described above in reference to FIG. 2.

The wireless communication device 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 500 may be configured to perform any one or more of the functions described herein. That is, the processor 504, as utilized in the wireless communication device 500, may be used to implement any one or more of the processes and procedures described below.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further.

A bus interface 508 provides an interface between the bus 502 and a transceiver 521. The transceiver 521 provides a means for communicating with various other apparatus over a transmission medium (e.g., air interface). Depending upon the nature of the apparatus, a user interface 512 (e.g., keypad, display, touch screen, speaker, microphone, control knobs, etc.) may also be provided. Of course, such a user interface 512 is optional, and may be omitted in some examples, such as a RSU. The bus interface 508 further provides an interface between the bus 502 and one or more peripherals. For example, peripherals may include an optional navigation system 522, an optional global positioning system (GPS) receiver 523, one or more optional sensors 524, an optional V2X system 525, and/or an optional camera 526.

In examples in which the wireless communication device 500 includes a V2X device, the V2X system 525 may be configured to obtain V2X data from the navigation system 522, GPS receiver 523, sensors 524, and/or camera 526. In addition, the V2X communication system 525 may be configured to receive V2X data from one or more neighbor V2X devices (e.g., vehicles, mobile devices of pedestrians, RSU's, etc., within a range of the V2X communication system 525) or from a V2X server via the transceiver 521. In examples in which the V2X device is within a vehicle, the V2X data may include one or more of a position (e.g., coordinates) of the vehicle and/or neighbor vehicle(s), a speed of the vehicle and/or neighbor vehicle(s), a trajectory of the vehicle and/or neighbor vehicle(s), a route of the vehicle and/or neighbor vehicle(s), traffic information, weather information, road hazard information, the location of one or more pedestrians or cyclists, etc. In addition, the V2X data may include video data captured from the camera 526 attached to the V2X device or received from another V2X device. The V2X data may further be transmitted to another V2X device via the transceiver 521.

The V2X system 525 may further communicate with the user interface 512 to enable a passenger or user in the vehicle cabin to interact with the V2X system 525. For example, the V2X system 525 may provide alerts or other information obtained from the V2X data to the user via the user interface 512. In some examples, the V2X system 525 may further control one or more components (not shown) of the V2X system to facilitate automated driving and/or assisted driving (e.g., control braking and/or steering for collision-avoidance).

The navigation system 522 provides a means for mapping or planning a route to one or more destinations for the V2X device 500. In the illustrated example, the navigation system 522 is illustrated external to the processing system 514; however, in another example, the navigation system 522 may be internal to the processing system 514, e.g., operational by the processor 504 utilizing software stored on the computer-readable medium 506. The GPS receiver 523 provides a means for communicating with a plurality of GPS satellites and determining position, speed, and trajectory information of the V2X device 500. The one or more sensors 524 may include any suitable set of one or more sensors, including, for example, sensors for determining whether the V2X device 500 is braking or accelerating. The set of sensors 524 may further include other types of gauges, such as a speedometer. The camera 526 may include a back-up camera or other camera attached to the V2X device. For example, when the V2X device is an RSU, the camera 526 may include a traffic camera attached to a traffic light or tollbooth.

The processor 504 is responsible for managing the bus 502 and general processing, including the execution of software stored on the computer-readable medium 506. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 504, causes the processing system 514 to perform the various functions described below for any particular apparatus. The computer-readable medium 506 and the memory 505 may also be used for storing data that is manipulated by the processor 504 when executing software.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. In some examples, the computer-readable medium 506 may be part of the memory 505. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include communication and processing circuitry 541 configured to communicate over a carrier to exchange control information and data with one or more other wireless communication devices. The carrier may be time-divided into a plurality of slots, such as the slot shown in FIG. 4.

In examples in which the wireless communication device 500 is a V2X device, the communication and processing circuitry 541 may be configured to transmit or receive a PSCCH and/or a PSSCH within one or more of the slots of a V2X carrier. In addition, the communication and processing circuitry 541 may further operate in coordination with the V2X system 525 to determine whether the V2X device has generated or obtained V2X data to be transmitted to other V2X devices. The communication and processing circuitry 541 may further be configured to generate control information within a PSCCH to reserve resources for a transmission of the V2X (or to reserve resources for an expected additional transmission of V2X data).

In examples in which the wireless communication device 500 is a V2X device or other sidelink device, the communication and processing circuitry 541 may further be configured to generate reservation information associated with a plurality of reservations, each associated with respective control information generated and transmitted on the PSSCH. For example, the reservation information may indicate the number of resource blocks reserved across one or more slots for each transmission. In some examples, the communication and processing circuitry 541 may correspond to or otherwise include the reservation circuitry 408 shown in FIG. 4. The communication and processing circuitry 541 may further be configured to execute communication and processing software 551 stored on the computer-readable medium 506 to implement one or more functions described herein.

The processor 504 may further include reservation missing circuitry 542, which may, in some examples, correspond to the reservation missing circuitry 406 shown in FIG. 4. The reservation missing circuitry 542 may be configured to miss one or more reservations generated by the communication and processing circuitry 541 based on any number of suitable factors. In addition, the reservation missing circuitry 542 may be configured to generate missed reservation information associated with missed reservations. The reservation missing circuitry 542 may further be configured to execute reservation missing software 552 stored on the computer-readable medium 506 to implement one or more of the functions herein.

The processor 504 may further include missed reservation metric calculation circuitry 543, which may, in some examples, correspond to the missed reservation metric calculation circuitry 402 shown in FIG. 4. The missed reservation metric calculation circuitry 543 may be configured to calculate a missed reservation metric based on at least the missed reservation information generated by the reservation missing circuitry 542. In some examples, the missed reservation metric indicates the number of missed reservations within a window of time (window 515), which may be maintained, for example, in memory 505. In other examples, the missed reservation metric indicates the total number of resource blocks reserved for the missed reservations within the window 515.

In some examples, the missed reservation metric may be calculated based on both the missed reservation information generated by the reservation missing circuitry 542 and the reservation information generated by the communication and processing circuitry 541. For example, the missed reservation metric may include a ratio of the number of missed reservations to the number of reservations made within the window 515, or a ratio of the total number of resource blocks reserved for the missed reservations to the complete number of resource blocks reserved for the reservations made within the window 515. In some examples, the missed reservation metric calculation circuitry 543 may calculate a separate missed reservation metric for each of a plurality of transmission characteristics, such as the priority, quality of service (QoS) indicator or traffic size associated with each transmission. The missed reservation metric calculation circuitry 543 may further be configured to execute missed reservation metric calculation software 553 stored on the computer-readable medium 506 to implement one or more of the functions described herein.

The processor 504 may further include reservation limiting circuitry 544, which may, in some examples, correspond to the reservation limiting circuitry 404 shown in FIG. 4. The reservation limiting circuitry 544 may be configured to compare the missed reservation metric generated by the missed reservation metric calculation circuitry 543 to a missed reservation limit 518 maintained, for example, in memory 505. The reservation limiting circuitry 544 may further be configured to operate together with the communication and processing circuitry 541 to limit additional (new) reservations when the missed reservation metric exceeds the missed reservation limit 518. For example, the reservation limiting circuitry 544, together with the communication and processing circuitry 541, may be configured to limit the number of reservations and/or the amount of reserved resources (e.g., reserved resource blocks over one or more slots for one or more transmissions) within a period of time. As another example, the reservation limiting circuitry 544, together with the communication and processing circuitry 541, may be configured to limit or prohibit scheduling of resources for additional packets (e.g., limiting the number of reservations and/or number of resource blocks)

until the missed reservation metric does not exceed the missed reservation limit 518. The reservation limiting circuitry 544 may further be configured to execute reservation limiting software 554 stored on the computer-readable medium 506 to implement one or more of the functions described herein.

Figure 6:
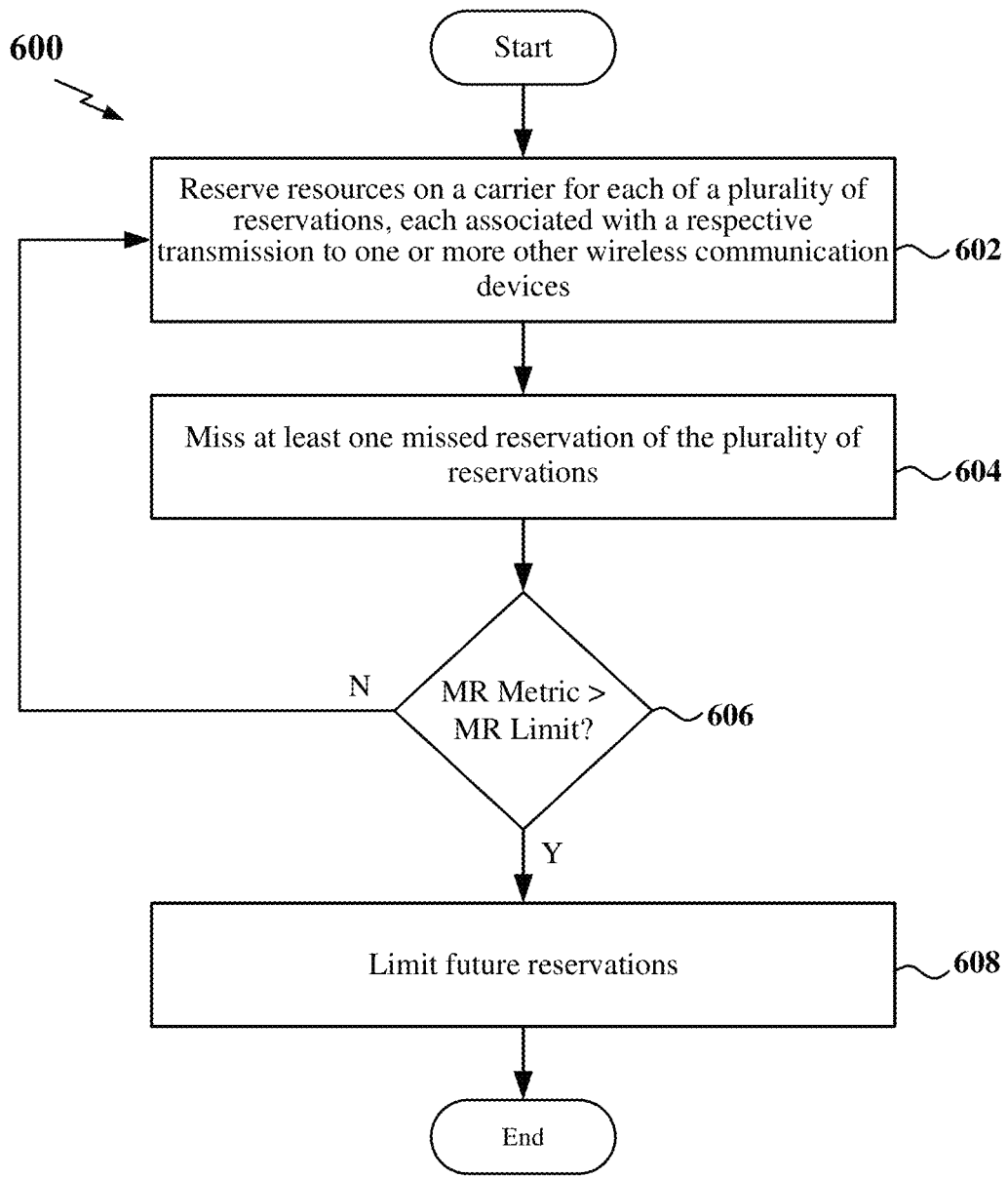
FIG. 6 is a flow chart of an exemplary method for wireless communication over a carrier according to some aspects.

FIG. 6 is a flow chart 600 of a method for wireless communication over a carrier (e.g., a V2X carrier). As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 602, the wireless communication device may reserve resources on the carrier for each of a plurality of reservations. Each of the reservations may be associated with a respective transmission by the wireless communication device to one or more other wireless communication devices. In some examples, the carrier includes spectrum that is time-divided into a plurality of slots and each of the reservations includes at least one resource block within at least one of the slots. For example, the communication and processing circuitry 541 shown and described above in connection with FIG. 5 may reserve resources on the carrier.

At block 604, the wireless communication device may miss at least one missed reservation of the plurality of reservations due to any number of suitable factors. For example, the reservation missing circuitry 542 shown and described above in connection with FIG. 5 may miss at least one reservation.

At block 606, the wireless communication device may determine whether a missed reservation (MR) metric associated with the at least one missed reservation exceeds a missed reservation (MR) limit. In some examples, the missed reservation metric includes the number of missed reservations (e.g., a second number of the at least one missed reservation). In other examples, the missed reservation metric includes a ratio of the number of the at least one missed reservation to the number of the plurality of reservations (e.g., a first number of the plurality of reservations). In other examples, the missed reservation metric includes a total number of resource blocks reserved for the at least one missed reservation to a complete number of resource blocks reserved for the plurality of reservations.

For example, the total number of resource blocks may include, for each missed reservation, a third number of resource blocks reserved for a slot multiplied by a fourth number of slots reserved. In addition, the complete number of resource blocks may include, for each of the reservations, a fifth number of resource blocks reserved for a slot multiplied by a sixth number of slots reserved. In yet another example, the missed reservation metric may include a separate missed reservation metric for each of a plurality of transmission characteristics, such as the priority, quality of service (QoS) indicator or traffic size associated with each transmission.

In some examples, the missed reservation limit indicates a maximum number of allowed missed reservations within a window of time. In other examples, the missed reservation limit represents a threshold against which a ratio of the second number of the at least one missed reservation to the first number of reservations may be compared. The missed reservation limit may further include a table mapping transmission characteristics (e.g., priorities, QoS indicators or traffic sizes) to respective missed reservation limits. For example, the missed reservation metric calculation circuitry 543, together with the reservation limiting circuitry 544, shown and described above in connection with FIG. 5 may determine whether the missed reservation metric exceeds the missed reservation limit.

When the missed reservation metric exceeds the missed reservation limit (Y branch of block 606), at block 608, the wireless communication device may limit additional reservations. In some examples, the wireless communication device may be configured to limit additional (new) reservations over a period of time and/or until the occurrence of an event when the missed reservation metric exceeds the missed reservation limit. For example, the wireless communication device may be configured to limit the number of reservations and/or the amount of reserved resources (e.g., reserved resource blocks over one or more slots for one or more transmissions) within the period of time. As another example, the wireless communication device may be configured to limit scheduling of resources for additional packets (e.g., the number of reservations and/or number of resource blocks) until the missed reservation metric no longer exceeds the missed reservation limit. For example, the reservation limiting circuitry 544, together with the communication and processing circuitry 541, shown and described above in connection with FIG. 5 may limit additional reservations.

Figure 7:
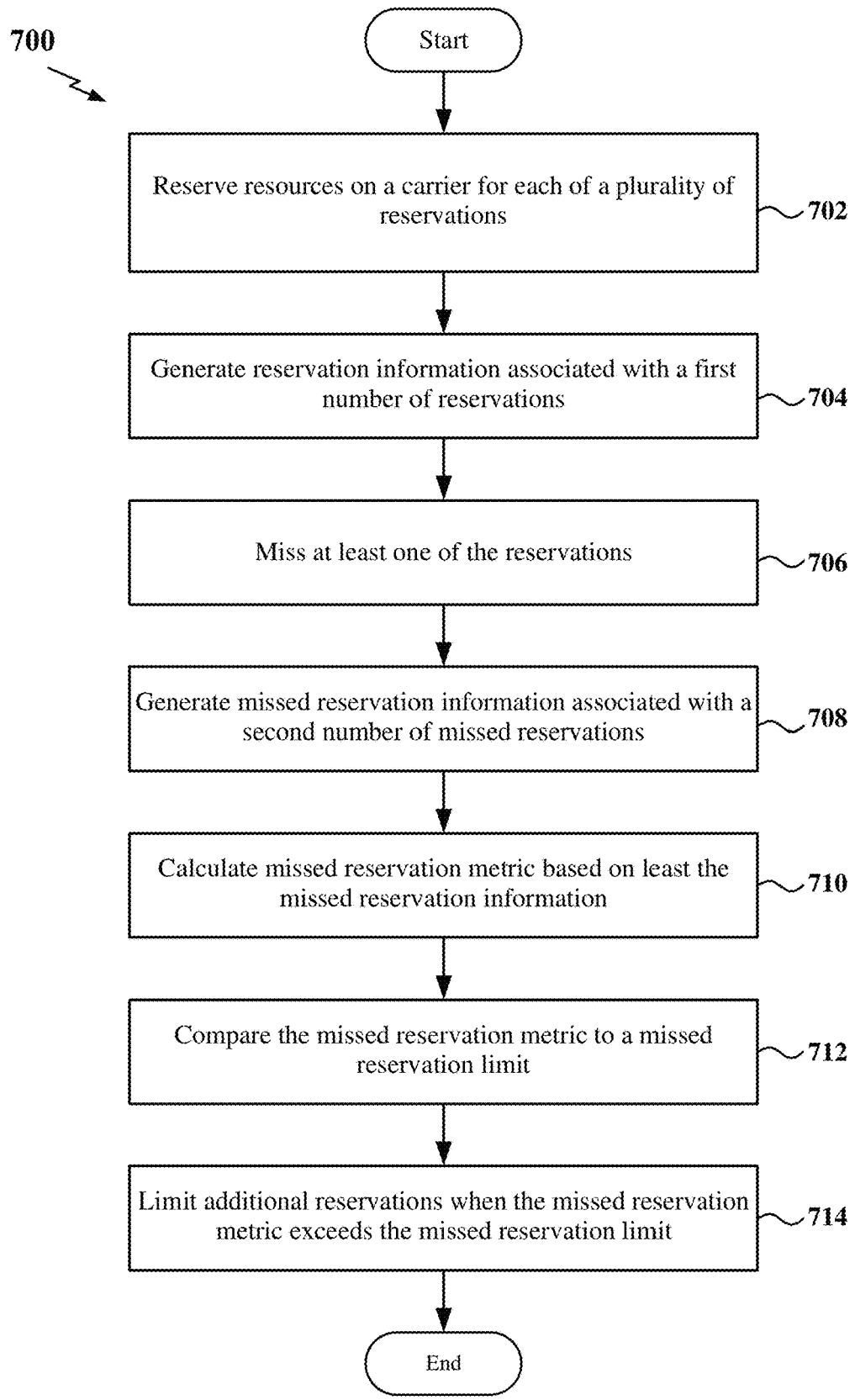
FIG. 7 is a flow chart of another exemplary method for wireless communication over a carrier according to some aspects.

FIG. 7 is a flow chart 700 of a method for wireless communication over a carrier (e.g., a V2X carrier). As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 702, the wireless communication device may reserve resources on the carrier for each of a plurality of reservations. Each of the reservations may include at least one resource block within at least one slot reserved for a transmission by the wireless communication device. For example, the communication and processing circuitry 541 shown and described above in connection with FIG. 5 may reserve resources on the carrier.

At block 704, the wireless communication device may generate reservation information associated with a first number of reservations. The reservation information may indicate, for example, the number of resource blocks reserved across a number of slots for each reservation. For example, the communication and processing circuitry 541 shown and described above in connection with FIG. 5 may generate the reservation information.

At block 706, the wireless communication device may miss at least one of the reservations due to any number of suitable factors. For example, the reservation missing circuitry 542 shown and described above in connection with FIG. 5 may miss at least one reservation.

At block 708, the wireless communication device may generate missed reservation information associated with a second number of missed reservations. The missed reservation information may indicate, for example, the number of resource blocks across the number of slots reserved for each of the missed reservations. For example, the reservation missing circuitry 542 shown and described above in connection with FIG. 5 may generate the missed reservation information.

At block 710, the wireless communication device may calculate a missed reservation metric based on at least the missed reservation information. In some examples, the missed reservation metric may indicate the second number of missed reservations. For example, the missed reservation metric may be calculated as a ratio of the second number of missed reservations to the first number of reservations. In other examples, the missed reservation metric indicates a total number of resource blocks reserved for (e.g., corresponding to) the missed reservations. In still other examples, the missed reservation metric may be calculated over a predefined window of time.

In further examples, the missed reservation metric may include a ratio of the total number of resource blocks reserved for all of the second number of missed reservations to a complete number of resource blocks reserved for all of the first number of reservations. For example, the total number of resource blocks may include, for each missed reservation, a third number of resource blocks reserved for a slot multiplied by a fourth number of slots reserved. In addition, the complete number of resource blocks may include, for each of the reservations, a fifth number of resource blocks reserved for a slot multiplied by a sixth number of slots reserved. In yet another example, the missed reservation metric may include a separate missed reservation metric for each of a plurality of transmission characteristics, such as the priority, quality of service (QoS) indicator or traffic size associated with each transmission. For example, the missed reservation metric calculation circuitry 543 shown and described above in connection with FIG. 5 may calculate the missed reservation metric.

At block 712, the wireless communication device may compare the missed reservation metric to a missed reservation limit. In some examples, the missed reservation limit indicates a maximum number of allowed missed reservations within a window of time. In other examples, the missed reservation limit represents a threshold against which a ratio of the second number of missed reservations to the first number of reservations may be compared. The missed reservation limit may further include a table mapping transmission characteristics (e.g., priorities, QoS indicators or traffic sizes) to respective missed reservation limits. For example, the reservation limiting circuitry 544 shown and described above in connection with FIG. 5 may compare the missed reservation metric to the missed reservation limit.

At block 714, the wireless communication device may limit additional reservations when the missed reservation metric exceeds the missed reservation limit. For example, the reservation limiting circuitry 544 together with the communication and processing circuitry 541 shown and described above in connection with FIG. 5 may limit additional reservations.

Figure 8:
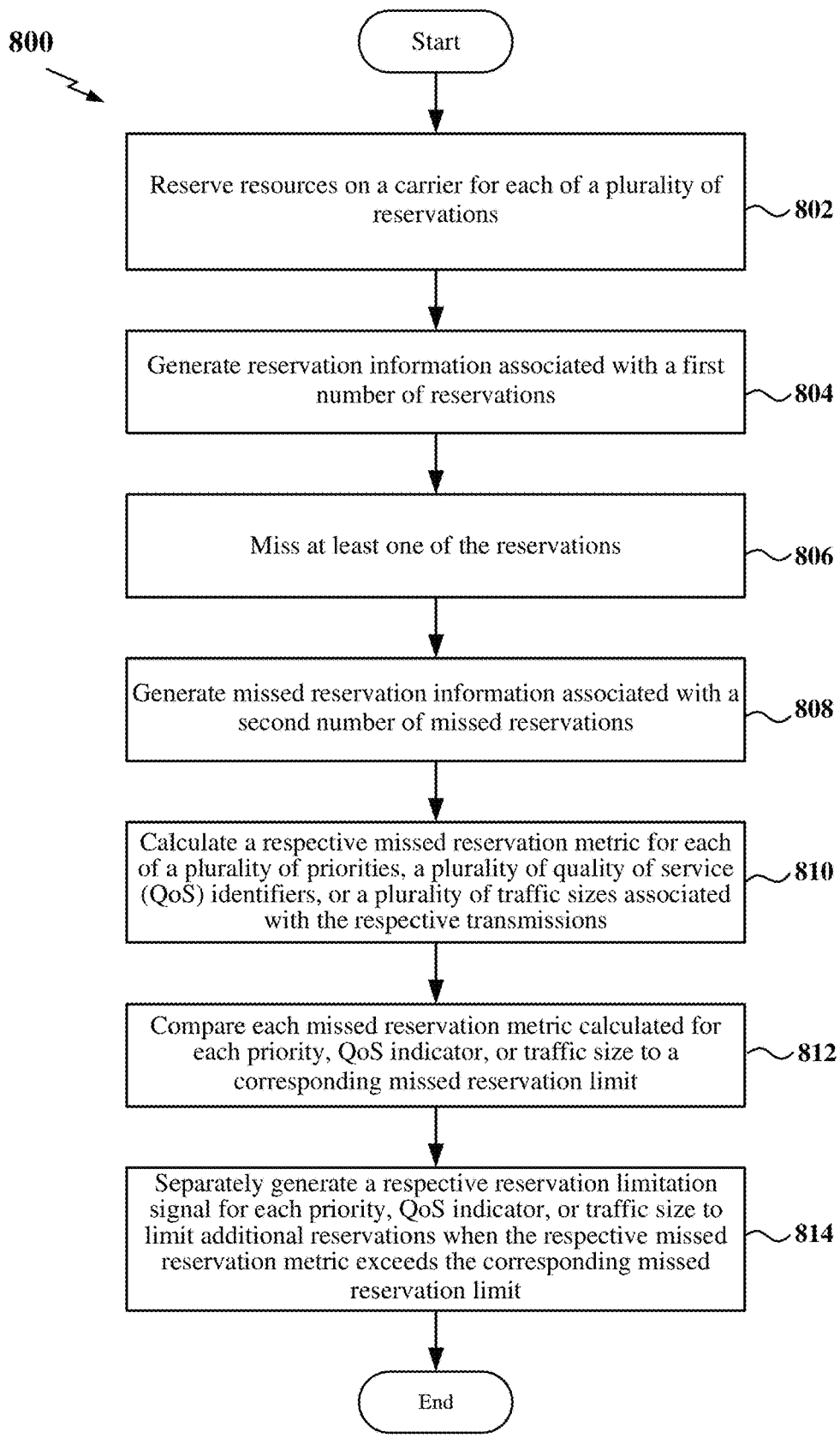
FIG. 8 is a flow chart of another exemplary method for wireless communication over a carrier according to some aspects.

FIG. 8 is a flow chart 800 of another method for wireless communication over a carrier (e.g., a V2X carrier). As described below, some or all illustrated features may be omitted in a particular implementation within the scope of the present disclosure, and some illustrated features may not be required for implementation of all embodiments. In some examples, the method may be performed by the wireless communication device 500, as described above and illustrated in FIG. 5, by a processor or processing system, or by any suitable means for carrying out the described functions.

At block 802, the wireless communication device may reserve resources on the carrier for each of a plurality of reservations. Each of the reservations may include at least one resource block within at least one slot reserved for a transmission by the wireless communication device. For example, the communication and processing circuitry 541 shown and described above in connection with FIG. 5 may reserve resources on the carrier.

At block 804, the wireless communication device may generate reservation information associated with a first number of reservations. The reservation information may indicate, for example, the number of resource blocks reserved across a number of slots for each reservation. For example, the communication and processing circuitry 541 shown and described above in connection with FIG. 5 may generate the reservation information.

At block 806, the wireless communication device may miss at least one of the reservations due to any number of suitable factors. For example, the reservation missing circuitry 542 shown and described above in connection with FIG. 5 may miss at least one reservation.

At block 808, the wireless communication device may generate missed reservation information associated with a second number of missed reservations. The missed reservation information may indicate, for example, the number of resource blocks across the number of slots reserved for each of the missed reservations. For example, the reservation missing circuitry 542 shown and described above in connection with FIG. 5 may generate the missed reservation information.

At block 810, the wireless communication device may calculate a respective missed reservation metric for each of a plurality of priorities, a plurality of quality of service (QoS) identifiers, or a plurality of traffic sizes associated with the respective transmissions. For example, each transmission (e.g., of a packet) may be associated with a particular priority, a particular QoS indicator, or a particular traffic size (e.g., length of the packet). The V2X device may identify the priority, QoS indicator, or traffic size associated with each reservation and each missed reservation. The V2X device may then calculate the respective missed reservation metric for each identified priority, QoS indicator, or traffic size. In some examples, each missed reservation metric may represent two or more of (or a range of) the priorities, QoS indicators or traffic sizes. For example, the missed reservation metric calculation circuitry 543 shown and described above in connection with FIG. 5 may calculate the missed reservation metrics.

At block 812, the wireless communication device may compare each missed reservation metric calculated for each priority, QoS indicator, or traffic size to a corresponding missed reservation limit. For example, the V2X device may include a table mapping transmission characteristics (e.g., priorities, QoS indicators or traffic sizes) to respective missed reservation limits. In some examples, the table may be received via radio resource control (RRC) signaling. For example, the reservation limiting circuitry 544 shown and described above in connection with FIG. 5 may compare the missed reservation metric to the missed reservation limit.

At block 814, the wireless communication device may separately generate a respective reservation limitation signal for each priority, QoS indicator, or traffic size to limit additional reservations when the respective missed reservation metric exceeds the corresponding missed reservation limit. Thus, the wireless communication device may limit additional reservations for certain priorities, QoS indicators, or traffic sizes, but not all priorities, QoS indicators, or traffic sizes. For example, the reservation limiting circuitry 544 together with the communication and processing circuitry 541 shown and described above in connection with FIG. 5 may limit additional reservations.

In one configuration, a wireless communication device includes means for reserving resources on the carrier for each of a plurality of reservations, each associated with a respective transmission to one or more other wireless communication devices. The wireless communication device further includes means for missing at least one missed reservation of the plurality of reservations, and means for limiting additional reservations when a missed reservation metric associated with the at least one missed reservation exceeds a missed reservation limit.

In one aspect, the aforementioned means for reserving resources on the carrier for each of a plurality of reservations, means for missing at least one missed reservation of the plurality of reservations, and means for limiting additional reservations when the missed reservation metric exceeds the missed reservation limit may be the processor(s) 504 shown in FIG. 5 configured to perform the functions recited by the aforementioned means.

For example, the aforementioned means for reserving resources on the carrier for each of a plurality of reservations may include the communication and processing circuitry 541 shown in FIG. 5. As another example, the aforementioned means for missing at least one missed reservation of the plurality of reservations may include the reservation missing circuitry 542 shown in FIG. 5. As another example, the aforementioned means for limiting additional reservations when the missed reservation metric exceeds the missed reservation limit may include the reservation limiting circuitry 544, together with the communication and processing circuitry 541, shown in FIG. 5. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, and/or 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device, the method comprising:
    reserving resources on a carrier for each of a plurality of reservations, each associated with a respective transmission to one or more other wireless communication devices;
    generating reservation information associated with a first number of the plurality of reservations;
    generating missed reservation information associated with a second number of at least one missed reservation; and limiting additional reservations when a missed reservation metric associated with the at least one missed reservation exceeds a missed reservation limit, wherein the missed reservation metric is based on the second number of the at least one missed reservation.

2. The method of claim 1, further comprising:
calculating the missed reservation metric based on at least the missed reservation information; and
comparing the missed reservation metric to the missed reservation limit.

3. The method of claim 2, wherein the missed reservation metric comprises a ratio of the second number of the at least one missed reservation to the first number of the plurality of reservations.

4. The method of claim 2, wherein:
the carrier comprises spectrum that is time-divided into a plurality of slots;
each of the plurality of reservations comprises at least one resource block within at least one of the plurality of slots; and
the missed reservation metric comprises a total number of resource blocks reserved for the second number of the at least one missed reservation.

5. The method of claim 4, wherein the missed reservation metric comprises a ratio of the total number of resource blocks reserved for the second number of the at least one missed reservation to a complete number of resource blocks reserved for the first number of the plurality of reservations.

6. The method of claim 5, wherein:
the total number of resource blocks comprises, for each of the at least one missed reservation, a third number of resource blocks reserved for one of the plurality of slots multiplied by a fourth number of the plurality of slots reserved; and
the complete number of resource blocks comprises, for each of the plurality of reservations, a fifth number of resource blocks reserved for one of the plurality of slots multiplied by a sixth number of the plurality of slots reserved.

7. The method of claim 2, wherein the calculating the missed reservation metric further comprises:
calculating the missed reservation metric over a pre-defined window of time.

8. The method of claim 2, wherein the calculating the missed reservation metric further comprises:
calculating a respective missed reservation metric for a plurality of priorities, a plurality of quality of service (QoS) identifiers, a plurality of traffic sizes associated with the respective transmissions, or some combination therof.

9. The method of claim 8, wherein the limiting the additional reservations further comprises:
separately limiting the additional reservations associated with at least one of the plurality of priorities, at least one of the plurality of QoS identifiers, or at least one of the plurality of traffic sizes based on respective comparisons between the respective missed reservations metrics and respective missed reservation limits associated therewith.

10. The method of claim 8, further comprising:
maintaining a table mapping the at least one of the plurality of priorities, the at least one of the plurality of QoS identifiers, the at least one of the plurality of traffic sizes, or some combination thereof to the respective missed reservation limits associated therewith.

11. The method of claim 10, further comprising:
receiving at least a portion of the table via radio resource control (RRC) signaling.

12. The method of claim 1, further comprising:
identifying the occurrence of the at least one missed reservation of the plurality of reservations.

13. A wireless communication device, comprising:
a processor;
a wireless transceiver coupled to the processor and configured to communicate over a carrier; and
a memory coupled to the processor, wherein the processor and the memory are configured to:
reserve resources on the carrier for each of a plurality of reservations, each associated with a respective transmission to one or more other wireless communication devices;
generate reservation information associated with a first number of the plurality of reservations;
generate missed reservation information associated with a second number of at least one missed reservation; and
limit additional reservations when a missed reservation metric associated with the at least one missed reservation exceeds a missed reservation limit, wherein the missed reservation metric is based on the second number of the at least one missed reservation.

14. The wireless communication device of claim 13, wherein the processor and the memory are further configured to:
calculate the missed reservation metric based on at least the missed reservation information; and
compare the missed reservation metric to the missed reservation limit.

15. The wireless communication device of claim 14, wherein the missed reservation metric comprises the second number of the at least one missed reservation or a ratio of the second number of the at least one missed reservation to the first number of the plurality of reservations.

16. The wireless communication device of claim 14, wherein:
the carrier comprises spectrum that is time-divided into a plurality of slots;
each of the plurality of reservations comprises at least one resource block within at least one of the plurality of slots; and
the missed reservation metric comprises a total number of resource blocks reserved for the second number of the at least one missed reservation.

17. The wireless communication device of claim 16, wherein the missed reservation metric comprises a ratio of the total number of resource blocks reserved for the second number of the at least one missed reservation to a complete number of resource blocks reserved for the first number of the plurality of reservations.

18. The wireless communication device of claim 17, wherein:
the total number of resource blocks comprises, for each of the at least one missed reservation, a third number of resource blocks reserved for one of the plurality of slots multiplied by a fourth number of the plurality of slots reserved; and
the complete number of resource blocks comprises, for each of the plurality of reservations, a fifth number of resource blocks reserved for one of the plurality of slots multiplied by a sixth number of the plurality of slots reserved.

19. The wireless communication device of claim 13, wherein the processor and the memory are further configured to:
calculate the missed reservation metric over a predefined window of time.

20. The wireless communication device of claim 13, wherein the processor and the memory are further configured to:
calculate a respective missed reservation metric for a plurality of priorities, a plurality of quality of service (QoS) identifiers, a plurality of traffic sizes associated with the respective transmissions, or some combination thereof.

21. The wireless communication device of claim 20, wherein the processor and the memory are further configured to:
separately limit the additional reservations associated with at least one of the plurality of priorities, at least one of the plurality of QoS identifiers, or at least one of the plurality of traffic sizes based on respective comparisons between the respective missed reservations metrics and respective missed reservation limits associated therewith.

22. The wireless communication device of claim 20, wherein the memory further comprises a table mapping the at least one of the plurality of priorities, the at least one of the plurality of QoS identifiers, the at least one of the plurality of traffic sizes, or some combination thereof to the respective missed reservation limits associated therewith.

23. The wireless communication device of claim 22, wherein the processor and the memory are configured to:
receive at least a portion of the table via radio resource control (RRC) signaling.

24. The wireless communication device of claim 13, wherein the wireless communication device comprises a vehicle-to-everything (V2X) device.

25. The wireless communication device of claim 13, wherein the processor and the memory are further configured to:
identify the occurrence of the at least one missed reservation of the plurality of reservations.

26. A wireless communication device for wireless communication over a carrier, the wireless communication device comprising:
means for reserving resources on the carrier for each of a plurality of reservations, each associated with a respective transmission to one or more other wireless communication devices;
means for generating reservation information associated with a first number of the plurality of reservations;
means for generating missed reservation information associated with a second number of at least one missed reservation; and
means for limiting additional reservations when a missed reservation metric associated with the at least one missed reservation exceeds a missed reservation limit, wherein the missed reservation metric is based on the second number of the at least one missed reservation.

27. The wireless communication device of claim 26, further comprising:
means for calculating the missed reservation metric based on at least the missed reservation information; and
means for comparing the missed reservation metric to the missed reservation limit.

28. The wireless communication device of claim 27, wherein the missed reservation metric comprises the second number of the at least one missed reservation or a ratio of the second number of the at least one missed reservation to the first number of the plurality of reservations.

29. The wireless communication device of claim 27, wherein:
the carrier comprises spectrum that is time-divided into a plurality of slots;
each of the plurality of reservations comprises at least one resource block within at least one of the plurality of slots; and
the missed reservation metric comprises a total number of resource blocks reserved for the second number of the at least one missed reservation or a ratio of the total number of resource blocks reserved for the second number of the at least one missed reservation to a complete number of resource blocks reserved for all of the first number of the plurality of reservations.

30. The wireless communication device of claim 27, wherein the means for calculating the missed reservation metric further comprises:
means for calculating the missed reservation metric over a predefined window of time.

31. The wireless communication device of claim 27, wherein the means for calculating the missed reservation metric further comprises:
means for calculating a respective missed reservation metric for a plurality of priorities, a plurality of quality of service (QoS) identifiers, a plurality of traffic sizes associated with the respective transmissions, or some combination thereof, and wherein the means for limiting the additional reservations further comprises:
means for separately limiting the additional reservations associated with at least one of the plurality of priorities, at least one of the plurality of QoS identifiers, or at least one of the plurality of traffic sizes based on respective comparisons between the respective missed reservations metrics and respective missed reservation limits associated therewith.

32. The wireless communication device of claim 26, further comprising:
means for identifying the occurrence of the at least one missed reservation of the plurality of reservations.

* * * * *